(No Model.)

J. R. ENSMINGER.
MILK COOLER.

No. 321,490. Patented July 7, 1885.

Witnesses:
L. C. Hills.
W. B. Masson

Inventor:
John R. Ensminger
by E. E. Masson
atty.

UNITED STATES PATENT OFFICE.

JOHN R. ENSMINGER, OF PALMYRA, PENNSYLVANIA.

MILK-COOLER.

SPECIFICATION forming part of Letters Patent No. 321,490, dated July 7, 1885.

Application filed April 9, 1885. (No model.)

*To all whom it may concern:*

Be it known that I, JOHN R. ENSMINGER, a citizen of the United States, residing at Palmyra, in the county of Lebanon and State of Pennsylvania, have invented certain new and useful Improvements in Milk-Coolers, of which the following is a specification, reference being had therein to the accompanying drawings.

My invention relates to improvements in apparatus for cooling milk; and the object is to provide a removable cooling-water reservoir adapted to be placed and retained in the center of a milk-receptacle to admit of the circulation of cold water or air around said receptacle to facilitate the raising of the cream.

Figure 1:
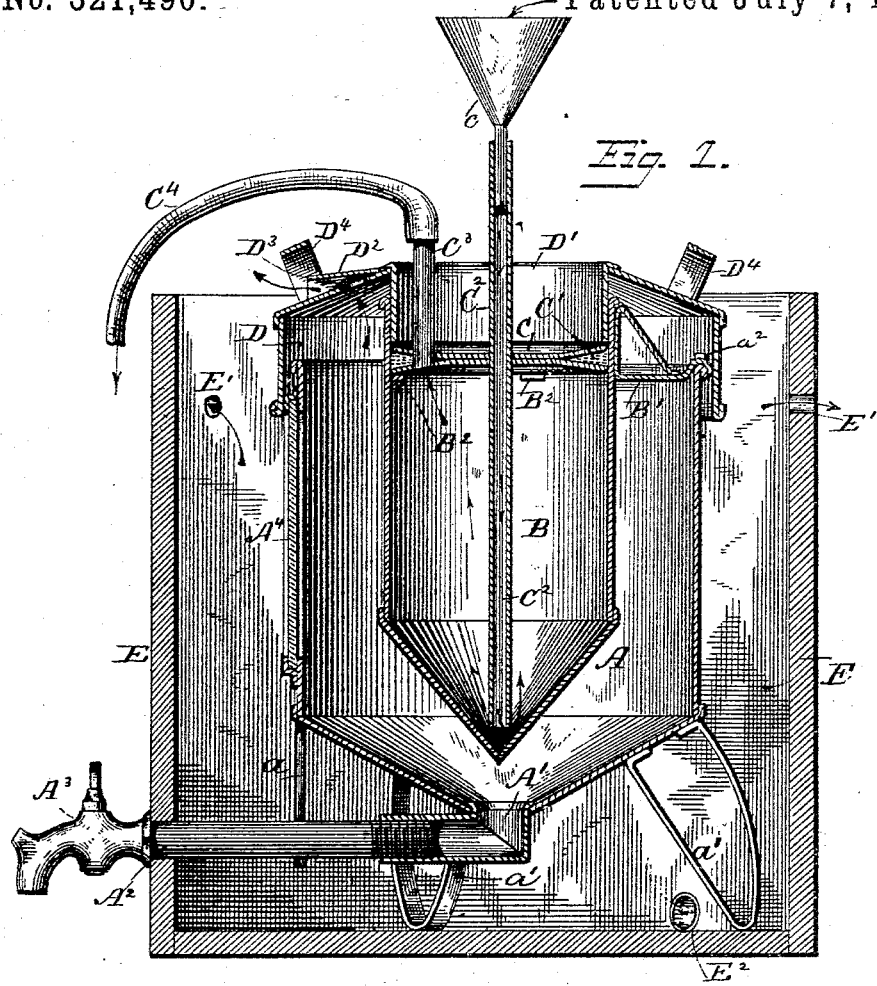
Figure 2:
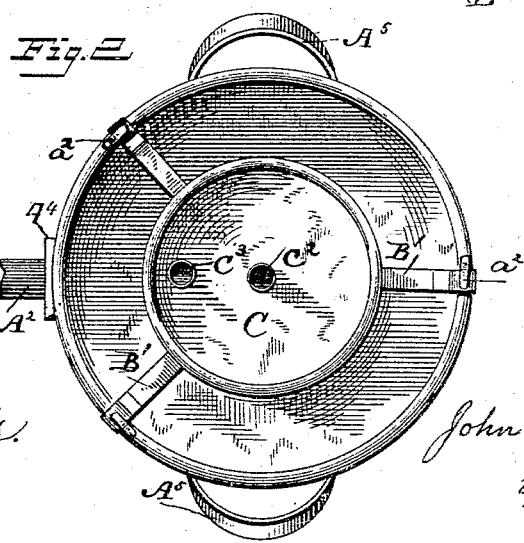

Figure 1 represents a vertical section of my improved apparatus, and Fig. 2 is a top view of the water-reservoir and milk-receptacle.

Like letters refer to like parts in the figures.

In the drawings, A represents the milk-receptacle, which is cylindrical and has a conical bottom, supported on feet $a'$, and provided with an outlet-pipe, A', preferably screw-threaded at its outer end to receive the pipe $A^2$, which is retained in position by a brace-rod, $a$, secured to the bottom of the receptacle. The pipe $A^2$ passes through the side of the water-tank E, and said pipe terminates in a faucet, $A^3$, for regulating the flow of the milk.

The cylindrical portion of the milk-receptacle A is provided with a cream-line gage, $A^4$, composed of an oblong piece of glass secured on the outer side of the cylinder and having its edges incased in a water-tight covering, which is provided with scale-notations. The milk-receptacle A is also provided with handles $A^5$, for lifting the same, and on its top edge or rim are a series of hooks, $a^2$, secured thereto, to receive thereunder the ends of the supporting-arms of the water-reservoir and prevent its accidental displacement. This cold-water reservoir B is cylindrical and provided with a conical-shaped bottom. To the sides and upper portion of said reservoir the supporting-arms B' are secured, to suspend it from the edge of the milk-receptacle and in the center thereof.

The inner sides of the water-reservoir are provided at the upper portion with a series of projecting lugs, $B^2$, upon which the piston-like stopper C, provided with packing C', rests when in use. Said stopper is provided with a central tube, $C^2$, which passes therethrough and extends close to the point of the conical bottom of the water-reservoir. The upper end extends above the reservoir B, and is provided with a funnel, $c$, to receive the water used. The stopper C is also provided with a short tube, $C^3$, which extends upward above the top of the reservoir B, to the end of which is connected a rubber hose, $C^4$, to carry off the water which enters the reservoir through the funnel $c$ and the tube $C^2$.

The milk-receptacle is provided with a close-fitting cover, D, having its sides cylindrical, and its top conical-shaped and provided with a central cylinder, D', open at both ends, and the sides of which fit closely within the top of the water-reservoir B, above the stopper C, and when pressed down into said reservoir it prevents the stopper from being forced upwardly by the current of the water admitted thereunder.

The conical top of the cover D is provided with a series of ventilating-holes, $D^2$, provided with hoods $D^3$. Said holes are to provide for the escape of the animal heat and gases contained in the fresh warm milk. The cover or lid is also provided with handles $D^4$.

The milk-receptacle may be inclosed in a cold-water tank, E, the feet $a'$ of the milk-receptacle resting upon the bottom of said tank. Cold water may be made to circulate through the tank by admitting it at the lower opening, $E^3$, and letting it overflow through the openings E' in the sides thereof at points lower than the top of the receptacle A. The opening $E^2$ can also be used when it is desired to empty the tank E.

Having now fully described my invention, I claim—

1. In a milk-cooler, the cold-water reservoir B, provided with lugs $B^2$ on the inner side, and arms B' on the outer and upper portion thereof, in combination with the piston-like stopper C, provided with packing C', a central tube, $C^2$, extending to the bottom thereof, and small tube $C^3$, with hose $C^4$ connected thereto, substantially as and for the purpose described.

2. In a milk-cooler, the water-reservoir B, provided with hooked arms B', lugs B², stopper C, provided with packing C', and tubes C² and C³, in combination with the milk-receptacle A, the cover D, having ventilating-holes D² and hoods D³, and provided with a central cylinder, D', and handles D⁴, substantially as and for the purpose described.

3. In a milk-cooler, the reservoir B, its arms B', internal lugs, B², the piston-like stopper C, its tubes C² and C³, and cover D, having ventilating-holes D² and hoods D³, in combination with the milk-receptacle A, having a conical bottom, its pipe A², faucet A³, feet a' at the bottom thereof, and the cream-gage A⁴, substantially as and for the purpose described.

4. In a milk-cooler, the combination of the milk-receptacle A, having hooks a² upon its rim, a conical bottom, pipe A², faucet A³, with the water-reservoir B, having arms B', to engage with the hooks a², the piston-like stopper C, having packing C', tubes C² and C³, and the cover D, substantially as and for the purpose described.

In testimony whereof I affix my signature in presence of two witnesses.

JOHN R. ENSMINGER.

Witnesses:
MARTIN EARLY,
J. G. STAUFFER.